United States Patent [19]

Rabinowitz et al.

[11] Patent Number: 4,520,078

[45] Date of Patent: May 28, 1985

[54] CORES FOR ELECTROMAGNETIC APPARATUS AND METHODS OF FABRICATION

[75] Inventors: Mario Rabinowitz, Redwood City; E. Robert Perry, Portola Valley, both of Calif.

[73] Assignee: Electric Power Research Institute, Inc., Palo Alto, Calif.

[21] Appl. No.: 271,420

[22] Filed: Jun. 8, 1981

[51] Int. Cl.[3] .......................... H01F 41/02; B23K 20/08

[52] U.S. Cl. ......................................... 428/636; 29/608; 29/609; 148/31.55; 148/403; 228/107; 228/190; 264/84; 264/DIG. 58; 428/940

[58] Field of Search ............... 228/107, 108, 109, 190, 228/178; 29/607, 609, 608; 148/31.55, 403; 419/8; 336/216; 428/900, 940; 264/84, DIG. 58

[56] References Cited

U.S. PATENT DOCUMENTS

| | | | |
|---|---|---|---|
| 2,384,215 | 9/1945 | Toulmin, Jr. | 264/DIG. 58 |
| 3,220,103 | 11/1965 | Simons | 29/421 E |
| 3,432,279 | 3/1969 | Mendelson et al. | 428/928 X |
| 4,201,837 | 5/1980 | Lupinski | 428/900 X |
| 4,325,895 | 4/1982 | Morris | 264/23 |
| 4,364,020 | 12/1982 | Lin et al. | 336/216 X |
| 4,385,944 | 5/1983 | Hasegawa | 148/31.55 |

FOREIGN PATENT DOCUMENTS

| | | | |
|---|---|---|---|
| 960340 | 6/1964 | United Kingdom | 228/107 |

OTHER PUBLICATIONS

*Journal of Materials Science*, vol. 14, (1979), pp. 2523–2526.

Cline et al., *Scripta Metall.*, 1977, 11, pp. 1137–1138.

Morris, *Metal Science*, Jun. 1980, pp. 215–220.

*Primary Examiner*—Kenneth J. Ramsey

*Attorney, Agent, or Firm*—Flehr, Hohbach, Test, Albritton & Herbert

[57] ABSTRACT

A number of metal cores especially suitable for use in an electrical induction device such as a transformer are disclosed herein along with respective methods of making these cores. In accordance with each of these methods, the appropriate metal material is initially provided and thereafter formed into an unsolidified, preliminary shape. Thereafter, while the material is in its preliminary shape, it is densified, preferably by means of explosion bonding, whereby to improve its permeability and saturation field characteristics. In one embodiment, a metal material is initially provided as a continuous strip. In another embodiment, the metal material is initially provided as a number of plates and still in another, preferred embodiment, amorphous metal particulate material is utilized. In this latter embodiment, the orientation of the particulate material is controlled to further improve the permeability and saturation field characteristics of the ultimately formed core.

4 Claims, 6 Drawing Figures

CORES FOR ELECTROMAGNETIC APPARATUS AND METHODS OF FABRICATION

The present invention relates generally to metal cores for use in an electrical induction device, e.g., electromagnetic apparatus such as transformers, motors and generators and more particularly to methods of making these cores, especially amorphous metal cores, with improved permeability and field saturation characteristics.

One comman way of making a metal core for use in an electrical induction device such as a transformer is to start with a continuous metal strip which is ultimately wound around an appropriate mandrel into its final shape. Suitable bonding adhesive and/or locking rings are provided to retain this final shape. Another approach is to initially provide a number of relatively thin plates which are laminated together in a stacked fashion so as to ultimately form the core. In either case, the density of the final core product may be relatively low and therefore adversely effects its permeability and field saturation capabilities since both depend greatly on density. Moreover, specifically with respect to amorphous metals (metallic glasses) there is a basic fabrication problem in that strips of ribbons simply cannot be made thicker than a certain amount. Furthermore, it is difficult to make the strips very wide.

In view of the foregoing, it is one object of the present invention to improve the permeability and field saturation characteristics of a metal core of the type recited by making the core in a way which increases its density substantially.

Another object of the present invention is to provide a technique for making metal cores, especially amorphous metal cores, which technique does not limit the core's ultimate thickness or width.

Still another object of the present invention is to further improve the permeability and field saturation characteristics of the metal core just recited by controlling the preferred magnetic orientation of the core during its formation.

Still another object of the present invention is to achieve the previous objectives for a core constructed of amorphous metal material.

As will be seen hereinafter, the present invention is directed to different methods of making various metal cores for use in an electrical induction device such as a transformer and specifically a device in which its core is subjected to a particular magnetic field displaying a predetermined orientation. In the formation of each of these different cores, the starting metal material is formed into an undensifed, e.g., unsolidified, preliminary shape. Thereafter, while the material is in this preliminary shape, it is densified, preferably by means of explosion bonding, thereby to yield high density packing of the constituents making up the material and therefore improve its permeability and field saturation characteristics in bulk form. In one embodiment, the metal material is initially provided in the form of a continuous strip which is ultimately wound around itself to form an unsolidified preliminary shape. In another embodiment, the ultimately formed core is initially fabricated utilizing a plurality of stacked, relatively thin plates. In still another, preferred embodiment, the metal material utilized to make the core is amorphous metal particulate material which is formed to the desired preliminary shape in a suitable mold, preferably an explosion bonding mold.

The various core embodiments just recited and their respective methods of fabrication will be described in more detail hereinafter in conjunction with the drawing wherein.

Figure 1:
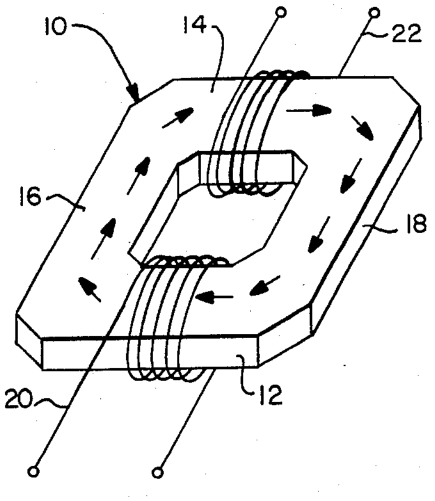
FIG. 1 is a perspective view of an ultimately formed core fabricated in accordance with the present invention and associated coils for use in an electrical induction device such as a transformer.

Turning now to the drawings, attention is first directed to FIG. 1 which illustrates a metal core 10 which is designed for use in an electrical induction device such as a transformer and which is fabricated in accordance with the present invention. The core 10 is somewhat rectangular in configuration, as defined by opposing legs 12, 14 and top and bottom ends 16 and 18, respectively. In the case of a transformer or the like, suitable coils generally indicated at 20 and 22 are wound around the legs 12 and 14. In the particular embodiment illustrated, the coils operate to produce a combined magnetic field across the core as generally indicated by the arrows. As will be seen hereinafer, core 10 has been fabricated in accordance with the present invention to provide relatively high permeability and field saturation characteristics. One way to accomplish this, as will also be seen, is to minimize internal air pockets or voids within the core, that is, to maximize its density. Another way is to align the preferred axis of orientation of the material making up the core at any point in or on the latter as close as possible with the magnetic field produced by coils 20, 22.

Figure 2:
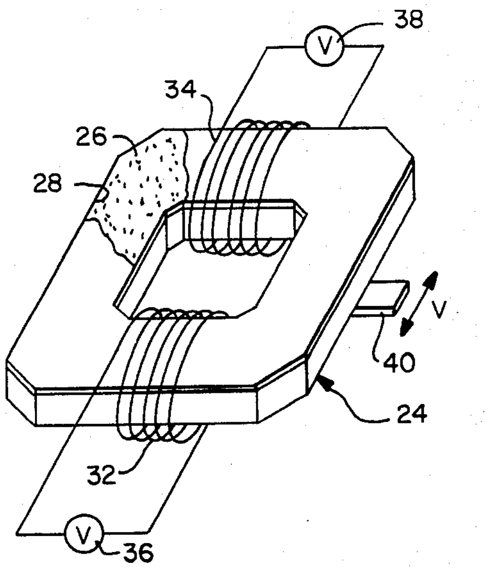
FIG. 2 is a perspective view of an explosion bonding mold and associated magnetic field coils diagrammatically illustrating one step in the fabrication of the metal core of FIG. 1.

Turning specifically to FIG. 2, attention is directed to a first step in the fabrication of core 10. There, a mold 24 especially suitable for explosion bonding is shown. This mold is designed to retain particulate material 26 within a mold cavity 28 which at least approximates the shape of core 10. In accordance with one aspect of the present invention, the starting material making up core 10 is comprised of metal particles, preferably amorphous metal particles. Such particles can be readily provided, for example in accordance with the process described in U.S. Pat. No. 4,154,284 which describes a method for producing amorphous metal flakes. While the metal particles can be of any general shape, for reasons to be discussed below, they are preferably generally spherical in configuration. The sizes of the particles are preferably graded to achieve a filling factor within the mold cavity of at least 80% and most preferably as high as 90%. This can be readily achieved by those with ordinary skill in the art.

Figure 4:
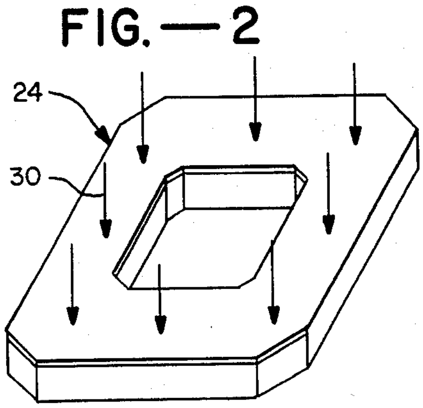
FIG. 4 is a perspective view of the mold of FIG. 1 diagrammatically illustrating a second step in the manufacture of the metal core of FIG. 1.

Once particles 26 are provided and placed with mold cavity 28 to form an unsolidified, preliminary shape, that is, a shape which approximates core 10, the entire unsolidified mass may be immediately densified. In the case of non-amorphous metal particles, this could be done mechanically. However, it is preferable and, in the case of amorphous particles, most likely necessary to solidify the mass by means of explosion bonding which is depicted diagrammatically in FIG. 4 by arrows 30. This solidifies the particles within cavity 28 into its final shape such that the core is at least 95% free of air voids. Since the permeability of air is 1.0 which is extremely small compared with the permeability of the metal material making up the core, it should be quite apparent that any increase in density of the core increases its permeability and saturation field. By utilizing metal particles as the starting material for the core and by explosion bonding the material into its final shape, the present invention capitalizes on this relationship. When the metal particles are amorphous, the explosion bonding process must be carefully controlled so as not to recrystallize the particles. One with skill in the explosion bonding art could readily provide such control.

As stated above, initially provided particles 26 are preferably solidified by means of explosion bonding. This particular process is well known in the art. See for example the article entitled COMPACTION AND MECHANICAL PROPERTIES OF METALLIC GLASS by D. G. Morris in *Metal Science*, June 1980, pages 215–220. In addition, the particular mold necessary in this process can be readily provided and, in this regard, it is to be understood that mold 24 is only intended as a diagrammatic illustration and does not represent the actual structural details of a suitable mold for this purpose.

While the fabrication technique thus far described has the unique capabilities of providing the metal core with a relatively high density, it is still quite possible that the permeability and field saturation capabilities of the core may suffer notwithstanding its high density. More specifically, in the case of non-amorphous metal, there is a preferred orientation in which the material exhibits superior magnetic properties such as permeability and field saturation capabilities. This is also true for amorphous metal even though the latter is presumed to be isotropic. In either case, when a core is initially made using a continuous strip of material or laminated plates, as in FIGS. 5 and 6 to be discussed hereinafter, the orientation of the metal material can be controlled to a large extent by controlling the position of the starting material. This is because the preferred orientations of the strip and the plates are fixed from the outset and, hence, both can be readily manipulated into their appropriate positions with magnetic orientation in mind. Thus, the preferred orientation of a large part of the material making up either of these cores can be aligned with the magnetic field associated with the core which, in turn, advantageously effects is permeability and field saturation characteristics.

On the other hand, it should be quite apparent that there is no easy way to control the combined orientation of all of the particles 26 merely by placing the particles within cavity 28 of mold 24. Therefore, it is quite possible that a substantial amount of the material will not be in alignment with its associated preferred magnetic field orientation and therefore less than optimum magnetic characteristics of the ultimately formed core would result, unless something is done to eliminate this possibility. However, as will be seen below, the present invention provides a relatively uncomplicated and reliable technique for controlling the combined orientation of the particulate material 26 after the latter has been placed in mold 24 but prior to being solidified into its final shape.

Figure 3:
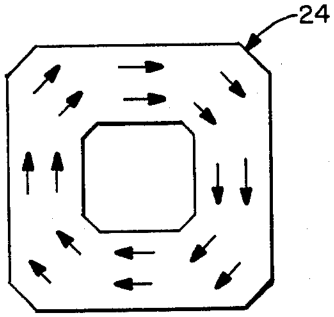
FIG. 3 is a diagrammatic illustration, in plan view, depicting how the magnetic field produced by the coils of FIG. 2 effect metal particulate material utilized in making the core of the present invention and initially disposed within the mold of FIG. 2.

Returning to FIG. 2 in conjunction with FIG. 3, mold 24 is shown including two electrical coils 32 and 34 disposed concentrically around the outside of two of its opposing legs in the same relative location with respect to the core as coils 20 and 22. Each coil 32 and 34 is excited by its own voltage source 36 and 38, respectively, in order to subject the entire mold including the loose particulate material 26 to the same magnetic field (from the standpoint of orientation, if not intensity) as the magnetic field environment that the core 10 would find itself in during actual operation. In this way, the individual metal particles making up particulate material 26 will tend to align their respective preferred magnetic axes of orientation with the external field. In order to maximize the number of particles which will in fact do this, the particles are preferably made spherical and, in any event, the entire mold 24 is preferably subjected to vibration within the magnetic field by suitable means generally indicated at 40 which is shown vibrating back and forth by means of the two-way arrow V. The most desirable end result is to align the preferred magnetic axis of orientation of each particle parallel with the magnetic field produced by coils 32, 34 and, hence, the magnetic field produced by coils 20, 22. Alignment could even be achieved by the coils 20, 22 which are part of the finished apparatus. In this case the mold itself could be part of the final product.

FIG. 3 diagrammatically illustrates the preferred magnetic axis of orientation of the individual particles by the shorter arrows disposed within mold 24. While it is not always possible to properly orient each and every particle, if a sufficient number of particles can be appropriately oriented so that the overall amount of properly oriented mass once solidified is at least equal to the properly oriented material in a core formed from a continuous strip or stacked plates, the particle-made core will display improved permeability and field saturation capabilities as a result of its increased density. Once mold 24 is subjected to the magnetic field produced by coils 32, 34 and the particulate material therein is suitably oriented, the particulate material therein is then densified by means of explosion bonding or the like before the postional relationship of the various particles can be disturbed. In this way, the orientation of each of the individual particles is fixed in the overall solid mass.

It should be apparent from the foregoing that overall core 10 fabricated in the aforedescribed manner has a substantially greater density than has been made possible heretofore and, at the same time, it can be made to display a preferred axis of orientation uniformly across its mass. Both of these achievements result in relatively high permeability and high field saturation characteristics and therefore a highly efficient core for use in an electrical induction device such as a transformer.

Figure 5:
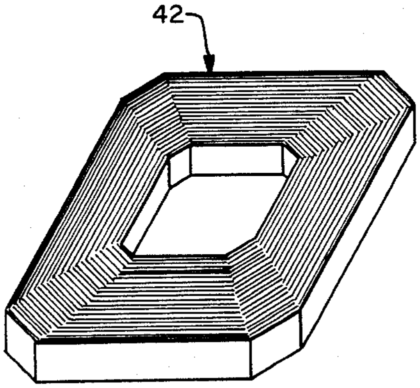
FIG. 5 is a perspective view of a metal core made in accordance with a second embodiment of the present invention.

Referring to FIG. 5, attention is directed to another core 42 designed in accordance with a second embodiment of the present invention. Core 42 is initially formed from a continuous strip of metal material, either amorphous or non-amorphous material, and wound into the general shape illustrated. Thereafter, the wound strip is placed into a cooperating explosion bonding mold and the various turns making up the core are explosion bonded together to densify the overall mass to a substantially greater extent than is possible by merely utilizing a standard winding process. While the exact mold necessary to accomplish this explosion bonding process is not shown, those with ordinary skill in the explosion bonding art could readily provide such means.

Figure 6:
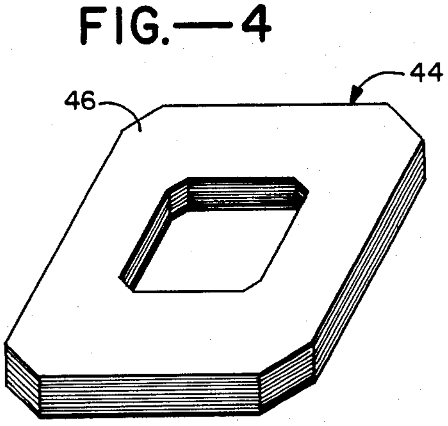
FIG. 6 is a perspective view of still another metal core made in accordance with a third embodiment of the present invention.

Still another core generally indicated at 44 is illustrated in FIG. 6. This core is originally formed from a plurality of relatively thin plates 46 which are initially stacked on top of one another and which in plan view take the shape of the core itself. Once these individual plates are stacked on one another, the entire stack is placed into a cooperating explosion bonding mold and explosion bonded into its final solidified or at least partially solidified mass. Like the process described with respect to FIG. 5, this explosion bonding process increases the overall density of the end core product 44 over what its density would otherwise be by merely adhesion bonding the plates together.

What is claimed is:

1. A method of making an amorphous metal core for use in an electrical induction device such as a transformer, said method comprising the steps of: initially providing appropriate amorphous metal material in the form of a continuous strip for use as said core; winding said continuous strip of material into an unsolidified, preliminary shape; and thereafter, while said unsolidified wound strip of material is in said preliminary shape, explosion bonding said material into a solidified final shape without causing the amorphous material to recrystallize, whereby to increase its density substantially and therefore improve its permeability and field saturation characteristics.

2. A product according to the process of claim 1.

3. A method of making an amorphous metal core for use in an electrical induction device such as a transformer, said method comprising the steps of: initially providing appropriate amorphous metal material for use as said core; forming said material into an unsolidified, preliminary shape; and thereafter, while said material is in said preliminary shape, explosion bonding said material into a solidified final shape without causing the amorphous material to recrystallize, whereby to increase its density substantially and therefore improve its permeability and field saturation characteristics, said initially provided material being provided in the form of a plurality of separate plates, each of which is substantially thinner than the final thickness of said core but has the same shape of the latter in plan view, and wherein said plates are placed in a stack to form said unsolidified preliminary shape.

4. A product according to the process of claim 3.

* * * * *